United States Patent Office 3,766,127
Patented Oct. 16, 1973

3,766,127
AMIDOSILICON LOW MODULUS ROOM TEMPERATURE VULCANIZABLE SILICONE ELASTOMER
Joseph N. Clark, Midland, Irvin D. Crossan, Homer Township, Midland County, and Louis H. Toporcer, Ingersol Township, Midland County, Mich., assignors to Dow Corning Corporation, Midland, Mich.
No Drawing. Filed Sept. 29, 1972, Ser. No. 293,605
Int. Cl. C08g 51/04
U.S. Cl. 260—37 SB                                  17 Claims

ABSTRACT OF THE DISCLOSURE

A composition stable under moisture free conditions and curable to a low modulus silicone elastomer at room temperature is a mixture of 100 parts by weight of a hydroxyl endblocked polydiorganosiloxane, 0 to 150 parts by weight of a non-acidic, non-reinforcing filler, 3.5 to 8 parts by weight of

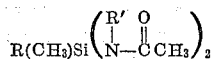

in which R is methyl or vinyl, R' is methyl, ethyl or phenyl and 0.3 to 4.2 parts by weight of

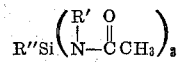

in which R' is defined above and R" is the same as R. The low modulus silicone elastomer is useful in building construction.

---

This invention relates to a room temperature vulcanizable silicone elastomer.

Room temperature vulcanizable silicone elastomers containing silanes having at least three amido groups are known in the art as shown by U.S. Pat. No. 3,417,047. Some of the disadvantages of these compositions are that the ingredients must be very carefully dried to provide a storage stable composition and the cross-linked product is readily separable from the substrate, thus, the adhesion to glass or metal is insufficient for many purposes such as in jointing. These disadvantages are described in U.S. Pat. No. 3,378,520 wherein these disadvantages are said to be overcome by adding to the composition certain alcoholate or phenolate complexes of titanium, zirconium and aluminum. Additionally, U.S. Pat. No. 3,364,160 describes the acid amides as resulting in a troublesome filling in the elastic end products. To overcome this problem, Gölitz et al. replace some of carboxylic acid amide radicals with lower alkoxy radicals.

It has now been found that amidosilicon compounds can be used to make compositions curing to low modulus silicone elastomers at room temperature without the above disadvantages. The compositions of the present invention which have these low modulus properties have a unique combination of two different types of amidosilanes.

It is therefore an object of the present invention to provide a one-package room temperature vulcanizable silicone elastomer composition which cures to a low modulur silicone elastomer. This object and others will become more apparent from the following detailed description of the present invention.

This invention relates to a composition which is stable in the absence of moisture but curable to room temperature upon exposure to moisture to a silicone elastomer consisting essentially of (A) 100 parts by weight of a hydroxyl endblocked polydiorganosiloxane having a viscosity at 25° C. of from 140 to 25,000 cs. and in which the organic groups are selected from the group consisting of methyl, ethyl, vinyl, phenyl and 3,3,3-trifluoropropyl radicals, in said polydiorganosiloxane no more than 50 percent of the organic groups being phenyl or 3,3,3-trifloro-propyl radicals and no more than 10 percent of the organic groups being vinyl radicals, (B) 0 to 150 parts by weight of a non-acidic, non-reinforcing filler, (C) 3.5 to 8 parts by weight inclusive of the silane of the general formula

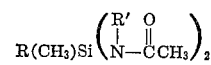

in which R is an organic radical selected from the group consisting of methyl and vinyl and R' is an organic radical selected from the group consisting of methyl, ethyl and phenyl, said silane being present in an amount sufficient to provide at least one silane molecule per hydroxyl of the polydiorganosiloxane, and (D) 0.3 to 4.2 parts by weight inclusive of a trifunctional silane of the general formula

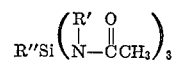

in which R' is defined above and R" is the same as R, said silane (C) being present in an amount greater than the amount of trifunctional silane (D), at least one of R and R" being vinyl, said composition when cured for seven days at 25° C. exposed to an air atmosphere having 50 percent relative humidity results in a silicone elastomer having an elongation of at least 600 percent, a durometer on the Shore A scale of from 8 to 20 inclusive and a modulus at 150 percent elongation of less than 50 pounds per square inch.

The hydroxyl endblocked polydiorganosiloxanes (A) can have a viscosity at 25° C. of from 140 to 25,000 cs., preferably from 1,000 to 10,000 cs. The hydroxyl endblocked polydiorganosiloxanes have organic groups selected from methyl, ethyl, vinyl, phenyl and 3,3,3-trifluoropropyl radicals. The organic groups of the polydiorganosiloxane contain no more than 50 percent phenyl or 3,3,3-trifluoropropyl radicals and no more than 10 percent vinyl radicals based on the total number of organic radicals in the polydiorganosiloxane. Other monovalent hydrocarbon radicals and halogenated monovalent hydrocarbon radicals in small amounts can be present in the polydiorganosiloxane. The diorganosiloxane units of the hydroxyl endblocked polydiorganosiloxane can be, for example, dimethylsiloxane, diethylsiloxane, ethylmethylsiloxane, diphenylsiloxane, methylphenylsiloxane, methylvinylsiloxane and 3,3,3-trifluoropropylmethylsiloxane. The term polydiorganosiloxane as used herein does not preclude small amounts of other siloxane units such as monoorganosiloxane units. The hydroxyl endblocked polydiorganosiloxanes are known in the art and can be made by known commercial methods. The preferred hydroxyl endblocked polydiorganosiloxane is hydroxyl endblocked polydimethylsiloxane.

The silane, (C), of the general formula

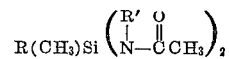

is a key ingredient of the compositions of this invention. In the formula, R represents an organic radical of the group methyl and vinyl and R' represents an organic radical of the group methyl, ethyl and phenyl. The silanes include, for example, methylvinyldi - (N - methylacetamido)silane, dimethyldi - (N - methacetamido)silane, methylvinyldi-(N - ethylacetamido)silane, dimethyldi-(N-ethylacetamido)silane, methylvinyldi - (N - phenylacetamido)silane and dimethyldi-(N-phenylacetamido)silane.

The trifunctional silanes, (D) have a general formula

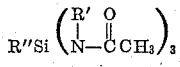

in which R' is defined above and R" is the same as R. The silanes include, for example, methyltri-(N-methylacetamido)silane, vinyltri - (N - methylacetamido)silane, methyltri-(N - ethylacetamido)silane, vinyltri-(N - ethylacetamido)silane, methyltri-(N - phenylacetamido)silane and vinyltri-(N-phenylacetamido)silane. These amidosilanes can be prepared by reacting the appropriate chlorosilane with an alkali metal salt of an appropriate N-organoacetamide. This method is further detailed in an application entitled, "Method of Preparing Amidosilanes," by Louis H. Toporcer and Irvin D. Crossan, Ser. No. 293,606, filed on even date herewith and hereby incorporated by reference for the preparation of the amidosilanes.

An illustration of the method for preparing the amidosilanes is as follows: mixing a sodium salt of N-methylacetamide with methylvinyldichlorosilane in an inert organic solvent such as toluene, filtering the by-produced sodium chloride from the toluene-product solution and thereafter removing the toluene by vacuum distillation to obtain the product, methylvinyldi - (N - methylacetamido)silane.

The amount of amidosilane, (C), can be from 3.5 to 8 parts by weight per 100 parts by weight of the hydroxyl endblocked polydiorganosiloxane (A), preferably from 5 to 8 parts by weight. Further, amidosilane, (C), is present in an amount sufficient enough to provide at least one molecule of silane per hydroxyl of the hydroxyl endblocked polydiorganosiloxane, (A). The amount of tri-functional amidosilane, (D), can be from 0.3 to 4.2 parts by weight per 100 parts by weight of the hydroxyl endblocked polydiorganosiloxane, preferably from 1 to 1.75 parts by weight when amidosilane, (C), is present in an amount of from 5 to 8 parts by weight. The amount of amidosilane (C) is present in an amount greater than the amount of tri-functional amidosilane, (D). Compositions having amounts of amidosilane (C), less than 3.5 parts by weight provide products which are unstable during storage, have a high modulus, and/or are punky or chessy products. Compositions having amounts of amidosilane (C), greater than 8 parts by weight provide products which have insufficient integrity and can be termed "punky." Compositions having amounts of trifunctional amidosilane, (D), less than 0.3 have insufficient cross-linking to provide useful low modulus silicon elastomers. Compositions having amounts of trifunctional amidosilanes, (D), greater than 4.2 parts by weight provide products which have either high modulus or are cheesy.

The ingredients, (A), (C) and (D) are interrelated in the amounts of each used. Since the amount of (A) is present in the compositions in the greatest amount, it is used as the base and the other ingredients are shown based on 100 parts by weight of (A). (C) is related to (A) in that the amount of (C) present in any given composition is sufficient enough to provide at least one molecule of (C) per hydroxyl group in (A). (D) is related to both (A) and (C) and is present in any given composition in an amount less than the amount of (C) present. Since (D) is trifunctional, it has a function of determining the amount of cross-linking, however, this function is not independent of the amounts of (C).

Because there exists some complex relationship between the ingredients (A), (C) and (D), it is strongly recommended that for any given amount of amidosilane (C) used, the amount of (D) to provide satisfactory useful low modulus properties that a few compositions be prepared with varying amounts of (D) between 0.3 and 4.2 parts by weight and be allowed to cure for seven days at 25° C. in an air atmosphere having 50 percent relative humidity. Those compositions which are useful low modulus silicone elastomers will have an elongation of at least 600 percent or greater as determined by ASTM-D-412, a durometer on the Shore A scale of from 8 to 20 inclusive as determined by ASTM-D-2240-64T and a modulus at 150 percent elongation of less than 50 pounds per square inch as determined by ASTM-D-412. Thus, with the above simple screening test one can readily eliminate compositions which are not useful as low modulus silicone elastomers and also single out those compositions having optimum properties.

Compositions of the present invention also contain a vinyl radical in silane (C) or in silane (D) or in both. Compositions, for example, which contain dimethyldi-(N-methylacetamido)silane and methyltri - (N - methylacetamido) silane result in materials which are cheesy, sticky or tacky after exposure to moisture at room temperature.

The compositions of this invention can also contain fillers. The fillers can be present in amounts of from 0 to 150 parts by weight per 100 parts by weight of (A), preferably from 10 to 125 parts by weight filler per 100 parts by weight of (A). These fillers can be any non-acidic, non-reinforcing filler and include for example, calcium carbonate, ferric oxide, non-acidic carbon black, diatomaceous earth, alumina, hydrated alumina, titanium dioxide, glass microballoons, organic fillers, resins, such as silicone resins, crushed quartz, calcium sulfate and the like. Other conventional additives can be used as long as they are neutral or basic, including pigments, dyes, antioxidants, heat stability additives, and the like.

The compositions being one package compositions are preferably made by mixing the hydroxyl endblocked polydiorganosiloxane and filler, if used, to make a mixture with the filler well dispersed, termed a polymer base. A suitable mixture can usually be obtained in one hour using commercial mixers. The resulting mixture is preferably deaired and then a mixture of the amidosilanes (C) and (D) is added and mixed with the polymer and filler mixture. This mixing is done under essentially anhydrous conditions and then the resulting composition is put into containers for storage under essentially anhydrous conditions. Once these one package compositions are made, they are stable for as long as one year if the essentially moisture free conditions are maintained, but will cure to low modulus silicone elastomers when exposed to moisture at room temperature. The addition of the mixture of amidosilanes (C) and (D) to the polymer base is the preferred method, however, one can add the trifunctional amidosilane (D) first followed by the amidosilane (C). This latter approach is somewhat more delicate and it is more difficult to obtain consistant properties using this method of adding (C) and (D) to the polymer base. The compositions of this invention allow for improved methods of preparation in that the ingredients need not be dried as carefully as prior art materials. For example, the fillers can be purchased commercially and used as received without the rigorous drying as in the past. Drying the fillers may increase the storage stability further, but is not necessary to provide a commercial storage composition.

The compositions of this invention are stored under anhydrous conditions because the amidosilanes are hydrolyzable when contacted by moisture. The compositions of the present invention are also adversely affected by acidic materials and thus the ingredients used in making the compositions of this invention should be neutral or basic to litmus paper when a small amount of the particular ingredient is placed in water.

The compositions of this invention when cured provide low modulus silicone elastomers having high elongation, of at least 600% and values of 1,000 to 1,800% are not unusual with a modulus at 150% elongation of less than 50 pounds per square inch (p.s.i) and a durometer on the Shore A scale of from 8 to 20. These low modulus silicone elastomers find utility in building construction, such as in sealing joints wherein the building materials sealed by these materials can expand and contract without breaking the seal. Another outstanding feature of the cured low modulus silicone elastomers of this invention is that the tear is a "knotty tear." A knotty tear refers to the type of tear propagation. The propagation in materials with a knotty tear will progress at sharp angles and thus instead of tearing along the entire length of a sealed joint the tear will progress across the width, for example, instead of the length of the joint. The low modulus silicone elastomers of this invention also have unprimed adhesion to a broad spectrum of building materials. The compositions of this invention also have a rapid skin-over time which helps to keep the sealing material clean because it skins over rapidly, and dirt, which would ordinarily adhere to a tacky surface, if several hours lapse before skin over, is avoided. The compositions of this invention are extrudable from containers directly to their use area.

The compositions of the present invention do not require a catalyst to aid in curing the compositions and it is observed that many of the conventional curing catalysts used in room temperature vulcanizable silicone elastomer compositions are detrimental to the curing of the compositions.

The following examples are presented for illustrative purposes only and should not be construed as limiting to the invention which is delineated in the claims.

Preparation of dimethyldi - (N - methylacetamido) silane.—To 1500 ml. of dry toluene in a five-liter flask equipped with a stirrer, nitrogen sweep, condenser and addition funnel, 50 g. (2.1 g. atoms) of sodium metal was added. This mixture was heated to reflux to make sodium sand and at the same time the addition of N-methylacetamide (174 g., 2.2 moles) was started. The addition of the N-methylacetamide was completed in 40 minutes with a slight change in color from yellow to light gray yellow observed. No exothermic reaction was observed but gas evolution was observed. After the addition of the N-methylacetamide, the reaction mixture was refluxed for several hours until the sodium metal had disappeared and no gas evolution was evident. The mixture was then cooled. The resulting product was a toluene suspension of the sodium salt of N-methylacetamide,

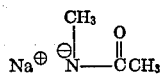

Thereafter, 129 g. of dimethyldichlorosilane was added to the toluene suspension of the sodium salt of N-methylacetamide over a 15-minute period. During this addition, the mixture was externally cooled with an ice-water bath. The mixture was then allowed to stand overnight and the by-produced sodium chloride was removed by passing the mixture through a filter containing a filter aid. The toluene was then removed by vacuum distillation and the silane product distilled wherein the maximum pot temperature was 140° C. The distilled product was 135 g. of dimethyldi-(N-methylacetamido)silane,

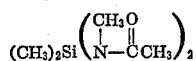

a 68% yield. The dimethyldi-(N-methylacetamido)silane had a boiling point range of 87 to 92° C. at 1 mm. of Hg.

Preparation of methylvinyldi - (N - methylacetamido)- silane.—A flask equipped with a stirrer, nitrogen sweep, condenser and addition funnel was charged with 300 g. of dry toluene and 250 g. of a toluene slurry of sodium salt of N-methylacetamide having 41 weight percent sodium salt of N-methylacetamide. To this slurry, 70 g. of methylvinylidichlorsilane was added over a 5 to 10 minute period while cooling with an ice-water bath. After the addition was completed, the mixture was heated to reflux and held at reflux for one hour. The resulting mixture was cooled to room temperature and passed through a filter containing filter aid to remove the by-produced sodium chloride from the solvent mixture. The salt filter cake was washed once with toluene and the wash was combined with the filtrate. The toluene was stripped from the filtrate using a Rinco evaporator to produce 99.5 g. of methylvinyldi-(N-methylacetamido) silane, a 93% yield. Analysis by gas liquid chromatography showed the product to be greater than 98% methylvinyldi-(N-methylacetamido)silane. The boiling point range was 85 to 88° C. at 1 mm. of Hg.

Preparation of methyltri-(N-methylacetamido)silane.— By the procedure of Example 1, 241 g. of N-methylacetamide was added to 69 g. of sodium metal in 2,000 ml. of dry toluene over a 1 hour and 15-minute period and thereafter refluxed for 2.5 hours, to obtain the slurry of sodium salt of N-methylacetamide in toluene. To the above slurry, 149.5 g. of methyltrichlorosilane was added over a 15 minute period while the mixture was externally cooled by an ice-water bath. After the addition of the methyltrichlorosilane was completed, the mixture was refluxed for 30 minutes and then allowed to stand overnight. The resulting mixture was filtered and the toluene removed by vacuum stripping. This product was a light yellow liquid in an amount of 244 g., or a crude yield of 94% methyltri-(N-methylacetamido)silane. This light yellow liquid product crystallizes upon standing at room temperature.

Preparation of vinyltri-(N-methylacetamido)silane.— In a 5-liter flask, 615 g. of sodium salt of N-methylacetamide and 1685 g. of dried toluene was added. To this mixture, 323 g. of vinyltrichlorosilane was added over a 15-minute period using an ice-water bath during the addition for cooling. The temperature approached reflux during the addition. After the addition was complete, the mixture was heated to reflux for 30 minutes and then cooled. The byproduced sodium chloride was removed by filtering through a filter aid cake with some filter aid mixed into the reaction mixture to assist the filtration. The light brown filtrate was stripped of toluene by using a Rinco evaporator, the heat source being hot water at about 50° C. The product was obtained in an amount of 473 g. or a crude yield of 86% of vinyltri-(N-methylacetamido)silane. The vinyltri-(N-methylacetamido)silane is initially a liquid which solidifies upon standing at room temperature.

Preparation of mixtures of diamidosilane and triamidosilane (A) In a flask under a nitrogen atmosphere, 92 g. of sodium metal was mixed with 2500 ml. of dry toluene and then heated to make sodium sand. To this mixture, 321 g. of N-methylacetamide was added. The reaction was completed in one hour and then the mixture was refluxed for one additional hour. The resulting slurry of sodium salt of N-methylacetamide was externally cooled with an ice bath and a mixture of 211 g. of methylvinyldichlorosilane and 37.2 g. of methyltrichlorosilane was added in a few minutes time. The mixture was then cooled, filtered and the toluene removed by an evaporator to give a 95% yield of a mixture of about 6 moles of methylvinyldi-(N-methylacetamido)silane and 1 mole of methyltri-(N-methylacetamido)silane.

(B) In a flask under nitrogen atmosphere, a mixture of 38 g. of methyltrichlorosilane and 177 g. of methylvinyldichlorosilane was added over a 20 minute period to 700 g. of a toluene slurry of the sodium salt of N-methylacetamide (47 weight percent salt). The reaction mixture was externally cooled by an ice bath. After completing the addition of the silane mixture, the reaction mixture was heated to reflux. The reaction mixture was cooled and filtered to remove the sodium chloride and then the toluene was stripped from the product by a Rinco evaporator using water at 50° C. as the heat source. The resulting product was 308 g. of a mixture of 5 moles of methylvinyldi-(N-methylacetamido)silane and 1 mole of methyltri-(N-methylacetamido)silane, a 92.5% yield.

(C) In a flask under a nitrogen atmosphere, a mixture of 56 g. of methyltrichlorosilane and 176 g. of methylvinyldichlorosilane was added over a 20 minute period to 800 g. of a toluene slurry of the sodium salt of N-methylacetamide (47 weight percent salt). No external cooling used. The mixture was heated at reflux for 0.5 hour. The mixture was cooled and the sodium chloride removed by filtering and the toluene removed by stripping to yield 328 g. of a product which was a mixture of 5 moles of methylvinyldi-(N-methylacetamido)silane and 1.5 moles of methyltri-(N-methylacetamido)silane, a 90% yield.

(D) In a flask under a nitrogen atmosphere, a mixture of 46 g. of methyltrichlorosilane and 177 g. of methylvinyldichlorosilane was added over a 20 minute period to 760 g. of a toluene slurry of the sodium salt of N-methylacetamide (47 weight percent salt). The resulting mixture was allowed to stand overnight at room temperature. The sodium chloride was removed by filtration and the toluene was removed by stripping to yield 300 g. of product which was a mixture of 5 moles of methylvinyldi-(N-methylacetamido)silane and 1.25 moles of methyltri-(N-methylacetamido)silane, an 86% yield.

The above silane mixtures will be referred to in the following examples as prepared silane mixtures, such as prepared silane mixture A. or prepared silane mixture B.

EXAMPLE 1

The following compositions were prepared by mixing a hydroxyl endblocked polydimethylsiloxane having a viscosity at 25° C. of 4,000 cs. and a commercially available calcium carbonate filler to give a polymer base. Thereafter, a mixture of the two defined silanes were added and mixed with the polymer base under essentially anhydrous conditions. The resulting compositions were then put into containers for storage under essentially anhydrous conditions.

(A)

100 parts by weight polydimethylsiloxane,
110 parts by weight calcium carbonate filler, dried before used,
5 parts by weight of the prepared silane mixture (A) above and
1 part by weight methyltri-(N-methylacetamido)silane.

(B)

100 parts by weight polydimethylsiloxane
110 parts by weight calcium carbonate filler, used as received,
6 parts by weight methylvinyldi-(N-methylacetamido)silane, and
1 part by weight methyltri-(N-methylacetamido)silane (C)

Same as (B) above, except 1.25 parts by weight of methyltri-(N-methylacetamido)silane in place of 1 part by weight.

(D)

Same as (B) above, except 1.5 parts by weight of methyltri(N-methylacetamido)silane in place of 1 part by weight.

(E)

Same as (B) above, except 5 parts by weight of methylvinyldi-(N-methylacetamido)silane in place of 6 parts by weight.

(F)

Same as (C) above, except 5 parts by weight of methylvinyldi-(N-methylacetamido)silane in place of 6 parts by weight.

(G)

Same as (C) above, except 7 parts by weight of methylvinyldi-(N-methylacetamido)silane in place of 6 parts by weight.

(H)

100 parts by weight polydimethylsiloxane,
110 parts by weight calcium carbonate filler, used as received, and
6 parts by weight of the prepared silane mixture (B) above.

(I)

Same as (H) above, except the prepared silane mixture (D) was used in place of the prepared silane mixture (B).

(J)

Same as (H) above, except the prepared silane mixture (C) was used in place of the prepared silane mixture (B).

(K)

Same as (H) above, except 5 parts by weight of the prepared silane mixture was used in place of 6 parts by weight.

(L)

Same as (I) above, except 5 parts by weight of the prepared silane mixture was used in place of 6 parts by weight.

(M)

Same as (J) above, except 5 parts by weight of the prepares silane mixture was used in place of 6 parts by weight.

The properties of the above compositions were determined as follows, wherein the properties of the cured elastomers were determined on samples cured for seven days at 25° C. exposed to air having a relative humidity of 50 percent. Each of the cured elastomers were low modulus elastomers. The extrusion rate was determined by Military Specification Mil-S-7502 with the results in grams per minute (gms./min.). The durometer was determined by ASTM-D-2240-64T on the Shore A scale. The tensile strength at break, elongation at break and 150% modulus were determined by ASTM-D-412 with the results in pounds per square inch (p.s.i.), percent extension and p.s.i. respectively. The skin-over time was determined by observing the time lapsed between the deposition of the composition with exposure to ambient moisture and the point at which the surface was dry to a light touch with a finger. The properties were as shown in Table I. The accelerated shelf-life was determined by heating the sealed containers at 70° C. and periodically checking the skin-over time, the extrusion rate, the uniformity of the composition and observing if the composition had gelled. If the composition had not gelled and the other properties were equivalent to the initial properties, the compositions were considered stable at the time checked.

TABLE I

| Composition: | Extrusion rate, gms./min. | Durometer, Shore A | Tensile strength at break, p.s.i. | Elongation at break, percent | 150% modulus, p.s.i. | Skin-over time, minutes | Accelerated shelf-life, weeks |
|---|---|---|---|---|---|---|---|
| A | 550 | 13 | 67 | 850 | 37 | 10 | >6 |
| B | 660 | 8 | 71 | 1,500 | 22 | 10 | 6 |
| C | 650 | 9 | 53 | 1,400 | 20 | 10 | >6 |
| D | 650 | 11 | 53 | 1,350 | 21 | 10 | >6 |
| E | 660 | 12 | 85 | 1,320 | 29 | 10 | >6 |
| F | 660 | 12 | 84 | 1,200 | 30 | 10 | >6 |
| G | 725 | 8 | 50 | 1,550 | 19 | 10 | >6 |
| H | 750 | 10 | 75 | 1,200 | 27 | 10 | >6 |
| I | 700 | 12 | 65 | 840 | 14 | 10 | >6 |
| J | 750 | 13 | 59 | 700 | 22 | 10 | >6 |
| K | 700 | 13 | 70 | 1,230 | 33 | 13 | 2 |
| L | 650 | 17 | 67 | 620 | 30 | 13 | >6 |
| M | 600 | 16 | 95 | 900 | 28 | 13 | >6 |

TABLE II
Unprimed Adhesion to the Indicated Substrate With the Percent Cohesive Failure Shown, Measured After Two Weeks

|  | Glass | Ceramic | Concrete |
|---|---|---|---|
| Composition: |  |  |  |
| B | 100 | 100 | 100 |
| C | 100 | 100 | 100 |
| D | 50 | 100 | 100 |
| E | 50 |  | 100 |
| F | 50 |  | 100 |

EXAMPLE 2

The following compositions were prepared and the properties were determined as described in Example 1 and the results were as shown in Table III.

(A)

100 parts by weight of a hydroxyl endblocked polydimethylsiloxane having a viscosity at 25° C. of 4,000 cs.
110 parts by weight of a commercially available calcium carbonate filler, used as received,
5 parts by weight of methylvinyldi-(N-methylacetamido)silane, and
1 part by weight of vinyltri-(N-methylacetamido)silane.

(B)

Same as (A) above, except 7 parts by weight methylvinyldi-(N-methylacetamido)silane used in place of 5 parts by weight.

(C)

100 parts by weight of the polydimethylsiloxane defined in (A) above,
110 parts by weight calcium carbonate filler, used as received,
5 parts by weight of dimethyldi-(N-methylacetamido)silane, and
1.5 parts by weight of vinyltri-(N-methylacetamido)silane.

(D)

100 parts by weight of the polydimethylsiloxane defined in (A) above.
110 parts by weight of calcium carbonate filler, used as received,
6 parts by weight of dimethyldi-(N-methylacetamido)silane, and
1.5 parts by weight of vinyltri-(N-methylacetamido)silane.

(E)

Same as (D) above, except 2 parts by weight of vinyltri-(N-methylacetamido)silane used in place of 1.5 parts by weight.

(F)

Same as (D) above, except 7 parts by weight of dimethyldi-(N-methylacetamido)silane used in place of 6 parts by weight.

(G)

Same as (E) above, except 7 parts by weight of dimethyldi-(N-methylacetamido)silane used in place of 6 parts by weight.

(H)

100 parts by weight of a hydroxyl endblocked polydimethylsiloxane having a viscosity at 25° C. of 2,200 cs.,
110 parts by weight of a commercially available calcium carbonate filler used as received,
6 parts by weight of methylvinyldi-(N-methylacetamido)silane, and
2 parts by weight of methyltri-(N-methylacetamido)silane.

(I)

Same as (H) above, except 3 parts by weight of methyltri-(N-methylacetamido)silane used in place of 2 parts by weight.

(J)

100 parts by weight of the polydimethylsiloxane defined in (A) above,
110 parts by weight of calcium carbonate filler, used as received,
6 parts by weight of methylvinyldi-(N-methylacetamido)silane, and
2 parts by weight of methyltri-(N-methylacetamido)silane.

(K)

Same as (J) above, except 3 parts by weight of methyltri-(N-methylacetamido)silane used in place of 2 parts by weight.

(L)

Same as (J) above, except 4 parts by weight of methyltri-(N-methylacetamido)silane used in place of 2 parts by weight.

(M)

Same as (L) above, except 8 parts by weight methylvinyldi-(N-methylacetamido)silane used in place of 6 parts by weight.

(N)

100 parts by weight of a hydroxyl endblocked polydimethylsiloxane having a viscosity at 25° C. of 12,500 cs.,
90 parts by weight of calcium carbonate filler, used as received,
7 parts by weight of methylvinyldi-(N-methylacetamido)silane, and
2 parts by weight of methyltri-(N-methylacetamido)silane.

(O)

Same as (N) above, except 4 parts by weight methyltri-(N-methylacetamido)silane used in place of 2 parts by weight.

(P)

100 parts by weight of the polydimethylsiloxane defined in (A) above,
110 parts by weight of calcium carbonate filler, used as received,
4 parts by weight of methylvinyldi-(N-methylacetamido)silane, and
1 part by weight of methyltri-(N-methylacetamido)silane.

(Q)

Same as (P) above, except 0.5 parts by weight of methyltri-(N-methylacetamido)silane used in place of 1 part by weight.

(R)

Same as (P) above, except 0.3 parts by weight of methyltri-(N-methylacetamido)silane used in place of 1 part by weight.

TABLE III

| Composition: | Extrusion rate, gms./min. | Durometer Shore A | Tensile strength at break, p.s.i. | Elongation, percent | 150% modulus, p.s.i. | Skin-over time, minutes |
|---|---|---|---|---|---|---|
| A | 750 | 17 | 56 | 1,025 | 31 | 11 |
| B | 750 | 14 | 48 | 1,175 | 23 | 11 |
| C |  | 20 |  |  | <50 | 45 |
| D |  | 15 |  |  | <50 | 45 |
| E |  | 20 |  |  | <50 | 30 |
| F |  | 13 |  |  | <50 | 50 |
| G |  | 18 |  |  | <50 | 30 |
| H |  | 17 |  | 800 | <50 |  |
| I |  | 17 |  | 600 | <50 |  |
| J |  | 13 |  | 1,500 | <50 |  |
| K |  | 13 |  | 1,000 | <50 |  |
| L |  | 13 |  | 600 | <50 |  |
| M |  | 8 |  | 1,200 | <50 |  |
| N |  | 8 |  | 1,200 | <50 |  |
| O |  | 8 |  | 1,200 | <50 |  |
| P |  | 10 |  | 800 | <50 |  |
| Q |  | 14 |  | 1,200 | <50 |  |
| R |  | 12 |  | 1,400 | <50 |  |

That which is claimed is:

1. A composition which is stable in the absence of moisture but curable at room temperature upon exposure to moisture to a silicone elastomer consisting essentially of a mixture prepared by mixing under anhydrous conditions (A) 100 parts by weight of a hydroxyl endblocked polydiorganosiloxane having a viscosity at 25° C. of from 140 to 25,000 cs. and in which the organic groups are selected from the group consisting of methyl, ethyl, vinyl, phenyl and 3,3,3-trifluoropropyl radicals, in said polydiorganosiloxane no more than 50 percent of the organic groups being phenyl or 3,3,3-trifluoropropyl radicals and no more than 10 percent of the organic groups being vinyl radicals, (B) 0 to 150 parts by weight of a non-acidic, non-reinforcing filler, (C) 3.5 to 8 parts by weight inclusive of a silane of the general formula

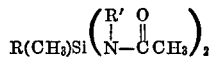

in which R is an organic radical selected from the group consisting of methyl and vinyl and R' is an organic radical selected from the group consisting of methyl, ethyl and phenyl, said silane being present in an amount sufficient to provide at least one silane molecule per hydroxyl of the polydiorganosiloxane, and (D) 0.3 to 4.2 parts by weight inclusive of a tri-functional silane of the general formula

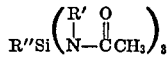

in which R' is defined above and R" is the same as R, said silane (C) being present in an amount greater than the amount of trifunctional silane (D), at least one of R and R" being vinyl, said composition when cured for seven days at 25° C. exposed to an air atmosphere having 50 percent relative humidity results in a silicone elastomer having an elongation of at least 600 percent, a durometer on the Shore A scale of from 8 to 20 inclusive and a modulus at 150 percent elongation of less than 50 pounds per square inch.

2. The composition in accordance with claim 1 in which the polydiorganosiloxane is a polydimethylsiloxane, silane (C) is methylvinyldi-(N-methylacetamido)silane and trifunctional silane (D) is methyltri-(N-methylacetamido)-silane.

3. The composition in accordance with claim 1 in which the polydiorganosiloxane is a polydimethylsiloxane, silane (C) is methylvinyldi-(N-methylacetamido)silane and trifunctional silane (D) is vinyltri-(N-methylacetamido)silane.

4. The composition in accordance with claim 1 in which the polydiorganosiloxane is a polydimethylsiloxane, silane (C) is dimethyldi-(N-methylacetamido)silane and trifunctional silane (D) is vinyltri-(N-methylacetamido)silane.

5. The composition in accordance with claim 2 in which the non-acidic, non-reinforcing filler is present in an amount of from 10 to 125 parts by weight.

6. The composition in accordance with claim 3 in which the non-acidic, non-reinforcing filler is present in an amount of from 10 to 125 parts by weight.

7. The composition in accordance with claim 4 in which the non-acidic, non-reinforcing filler is present in an amount of from 10 to 125 parts by weight.

8. The composition in accordance with claim 5 in which the viscosity of the polydimethylsiloxane is from 1000 to 10,000 cs. at 25° C.

9. The composition in accordance with claim 6 in which the viscosity of the polydimethylsiloxane is from 1000 to 10,000 cs. at 25° C.

10. The composition in accordance with claim 7 in which the viscosity of the polydimethylsiloxane is from 1000 to 10,000 cs. at 25° C.

11. The composition in accordance with claim 8 in which silane (C) is present in an amount of from 5 to 8 parts by weight and trifunctional silane (D) is present in an amount of from 1.0 to 1.75 parts by weight.

12. The composition in accordance with claim 9 in which silane (C) is present in an amount of from 5 to 8 parts by weight and trifunctional silane (D) is present in an amount of from 1.0 to 1.75 parts by weight.

13. The composition in accordance with claim 10 in which silane (C) is present in an amount of from 5 to 8 parts by weight and trifunctional silane (D) is present in an amount of from 1.0 to 1.75 parts by weight.

14. The composition in accordance with claim 11 in which the non-acidic, non-reinforcing filler is calcium carbonate.

15. The composition in accordance with claim 12 in which the non-acidic, non-reinforcing filler is calcium carbonate.

16. The composition in accordance with claim 13 in which the non-acidic, non-reinforcing filler is calcium carbonate.

17. A composition consisting essentially of a mixture prepared by mixing under anhydrous conditions a polymer base consisting essentially of (A) 100 parts by weight of a hydroxyl endblocked polydiorganosiloxane having a viscosity at 25° C. of from 140 to 25,000 cs. and in which the organic groups are selected from the group consisting of methyl, ethyl, vinyl, phenyl and 3,3,3-trifluoropropyl radicals, in said polydiorganosiloxane no more than 50 percent of the organic groups being phenyl or 3,3,3-trifluoropropyl radicals and no more than 10 percent of the organic groups being vinyl radicals, (B) 0 to 150 parts by weight of a non-acidic, non-reinforcing filler, with a mixture of (C) a silane of the general formula

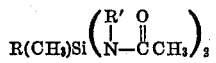

and (D) a trifunctional silane of the general formula

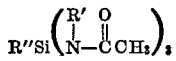

in which R is an organic radical selected from the group consisting of methyl and vinyl, R' is an organic radical selected from the group consisting of methyl, ethyl and phenyl, and R" is the same as R, said silane (C) being present in an amount sufficient to provide from 3.5 to 8 parts by weight inclusive per 100 parts by weight of polydiorganosiloxane (A) and said silane (C) being present in an amount sufficient to provide at least one silane molecule per hydroxyl of the polydiorganosiloxane, said trifunctional silane (D) being present in an amount sufficient to provide from 0.3 to 4.2 parts by weight inclusive per 100 parts by weight polydiorganosiloxane (A), said silane (C) being present in an amount greater than the amount of trifunctional silane (D), at least one of R and R" being vinyl, the resulting composition being stable in the absence of moisture but upon exposure to moisture cures to a silicone elastomer, when cured for seven days at 25° C. exposed to an air atmosphere having 50 percent relative humidity, said composition results in a silicone elastomer having an elongation of at least 600 percent, a durometer on the Shore A scale of from 8 to 20 inclusive and a modulus at 150 percent elongation of less than 50 pounds per square inch.

References Cited
UNITED STATES PATENTS

| | | | |
|---|---|---|---|
| 3,364,160 | 1/1968 | Golitz et al. | 260—18 |
| 3,378,520 | 4/1968 | Sattlegger et al. | 260—46.5 |
| 3,417,047 | 12/1968 | Golitz et al. | 260—37 |

DONALD E. CZAJA, Primary Examiner

M. I. MARQUIS, Assistant Examiner

U.S. Cl. X.R.

117—124 F, 135.1; 260—46.5 E, 46.5 G, 825